UNITED STATES PATENT OFFICE.

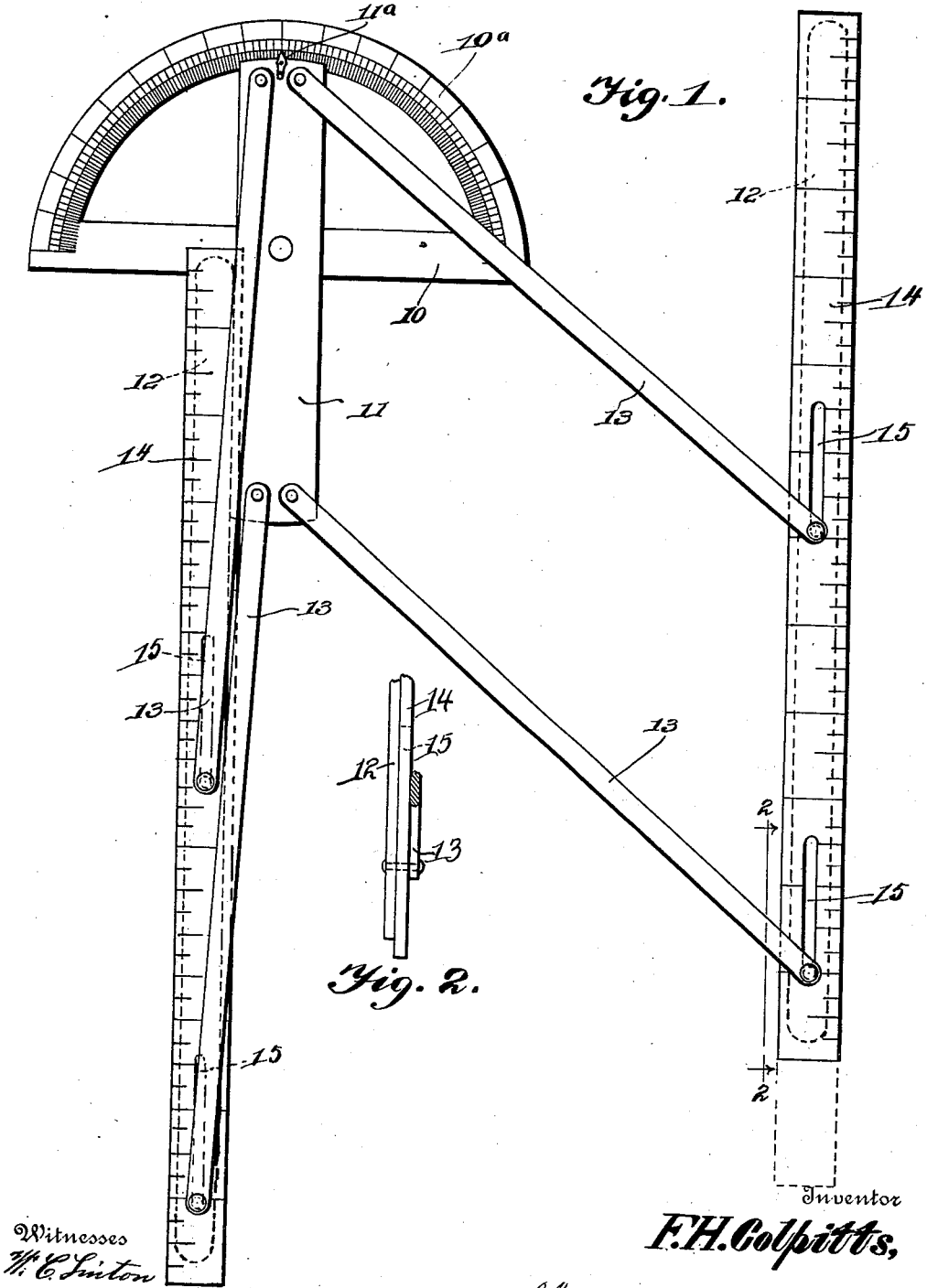

FAWCETT H. COLPITTS, OF GATES, OREGON.

PROTRACTOR.

1,095,552.   Specification of Letters Patent.   Patented May 5, 1914.

Application filed October 3, 1911. Serial No. 652,608.

*To all whom it may concern:*

Be it known that I, FAWCETT H. COLPITTS, a citizen of Great Britain, residing at Gates, in the county of Marion and State of Oregon, have invented certain new and useful Improvements in Protractors; and I do hereby declare the following to be a full, clear, and exact description of the invention, such as will enable others skilled in the art to which it appertains to make and use the same.

This invention relates to new and useful improvements in protractors, and has for its principal object to provide a simple device of this character whereby lines may be drawn at any given angle to each other and at any desired distance from a given point without moving the body of the protractor from a fixed position.

Heretofore it has been customary in the use of protractors, to place the same upon a T square and mark the angle to which the line is to be drawn, using a triangle for this purpose.

The object of the present invention is to overcome this objectionable feature and form a construction whereby the angle may be drawn absolutely independent of the triangle, and at the same time produce an accurate drawing.

With the above and other objects in view, this invention consists in the construction, combination and arrangement of parts, all as hereinafter more fully described, claimed and illustrated in the accompanying drawings, wherein:

Figure 1 is an elevation illustrating a protractor constructed in accordance with the present invention; and Fig. 2 is a section taken along line 2—2 of Fig. 1.

The protractor forming the subject matter of the present invention comprises a protractor of the usual construction, having a semi-circular plate provided with graduations thereon. A main supporting member or rule is pivoted or otherwise secured centrally to the body of the protractor, and is provided at the terminal thereof adjacent to the graduations of said protractor with an indicator. A plurality of links are pivotally connected to the main body of the supporting member or rule, and carry a rule at the terminal thereof at each side of the main supporting member, said rules being adapted to be at all times parallel to said member. Each rule is provided with a graduated rule slidably mounted on the upper surface thereof, as is specifically illustrated in Fig. 2.

Reference being had more particularly to the drawings, 10 indicates a protractor of any suitable construction, provided with a semi-circular graduated disk 10$^a$. A central or main supporting rule 11 is pivoted to the protractor 10, and is provided at its outer terminal with an indicator, 11$^a$, which coöperates with the graduations 10$^a$ on the protractor. A plurality of rules 12 are pivotally connected to the main supporting rule 11, through the instrumentality of the links 13, which are pivotally connected to said rules 12, and are adapted to retain the same constantly parallel to the main supporting rule 11. A graduated rule 14 is reciprocatingly mounted upon each rule 12 thereof, through the instrumentality of the slots 15 which receive the pins connecting the links 13 to the rules 12.

Having thus fully described my invention, what I claim as new and desire to secure by U. S. Letters Patent, is:

A protractor comprising a semi-circular plate having graduations upon its curved edge, a rule pivoted centrally to the straight edge of said semi-circular plate, an indicator secured to the terminal of said rule adjacent the graduations on said plate, a pair of equal links pivoted at their extremities to each side of said rule adjacent the ends thereof, a second rule having a graduated rule reciprocatingly mounted thereon secured to each pair of links at points spaced apart a distance equivalent to the length of the first mentioned rule, whereby lines may be drawn at any given angle to each other and at any desired distance from a given point without moving the semi-circular plate and first mentioned rule from a fixed position.

In testimony whereof I affix my signature in presence of two witnesses.

FAWCETT H. COLPITTS.

Witnesses:
CECILE KNOX,
C. E. SOX.

---

Copies of this patent may be obtained for five cents each, by addressing the "Commissioner of Patents, Washington, D. C."